(12) United States Patent
Holz et al.

(10) Patent No.: US 9,037,201 B2
(45) Date of Patent: May 19, 2015

(54) COUPLING AN ELECTRONIC APPARATUS HAVING A RADIO LINK, IN PARTICULAR A MOBILE TELEPHONE, TO DEVICES OF A MOTOR VEHICLE

(75) Inventors: Rainer Holz, Berlin (DE); Ronald Heldt, Rangsdorf (DE); Thomas August, Berlin (DE); Ronny Reimann, Berlin (DE)

(73) Assignee: Novero Dabendorf GmbH, Dabendorf (DE)

( * ) Notice: Subject to any disclaimer, the term of this patent is extended or adjusted under 35 U.S.C. 154(b) by 366 days.

(21) Appl. No.: 13/810,366

(22) PCT Filed: Jul. 18, 2011

(86) PCT No.: PCT/EP2011/062265
§ 371 (c)(1),
(2), (4) Date: Jun. 12, 2013

(87) PCT Pub. No.: WO2012/010560
PCT Pub. Date: Jan. 26, 2012

(65) Prior Publication Data
US 2013/0252661 A1    Sep. 26, 2013

(30) Foreign Application Priority Data

Jul. 23, 2010 (DE) .......................... 10 2010 027 620

(51) Int. Cl.
| | |
|---|---|
| *H04M 1/00* | (2006.01) |
| *H04B 5/00* | (2006.01) |
| *G08C 17/02* | (2006.01) |
| *H01Q 1/00* | (2006.01) |
| *H01Q 1/32* | (2006.01) |

(Continued)

(52) U.S. Cl.
CPC .............. *H04B 5/0037* (2013.01); *G08C 17/02* (2013.01); *G08C 2201/20* (2013.01); *G08C 2201/93* (2013.01); *H01Q 1/007* (2013.01); *H01Q 1/3291* (2013.01); *H01Q 3/24* (2013.01);
(Continued)

(58) Field of Classification Search
USPC .................. 455/41.1, 41.2, 90.2, 90.3, 552.1, 455/553.1, 557, 569.1, 569.2, 575.1, 575.9
See application file for complete search history.

(56) References Cited

U.S. PATENT DOCUMENTS

| | | | | |
|---|---|---|---|---|
| 5,151,047 | A | * | 9/1992 | Phillips .......................... 439/333 |
| 5,445,355 | A | * | 8/1995 | Chen .............................. 248/514 |

(Continued)

FOREIGN PATENT DOCUMENTS

| | | |
|---|---|---|
| DE | 10321429 A1 | 12/2003 |
| DE | 102009033751 A1 | 4/2010 |

(Continued)

*Primary Examiner* — Quochien B Vuong
(74) *Attorney, Agent, or Firm* — James R. Crawford; Norton Rose Fulbright US LLP

(57) ABSTRACT

A system for wirelessly coupling a radio device (111) via a radio link has a support surface (119) for placing radio device (111) thereon; an antenna in order to produce and maintain wireless coupling of the radio device, or a plurality of antennas (217a, 217b) positioned adjacently which can be selectively operated to produce and maintain wireless coupling of radio device (111). Support surface (119) has a rotationally symmetrical recess (117) extending around an axis of rotation (18) perpendicular to support surface (119), wherein, at different rotational positions relative to the axis of rotation (18), a radio device (111) having a projection (204) which engages in recess (117) can operate a radio link to the antenna, or to one of the antennas (217). Alternatively a radio device rests against support surface (119) and is located in any orientation and any position within a space defined by support surface (7).

20 Claims, 6 Drawing Sheets

Figure 1:
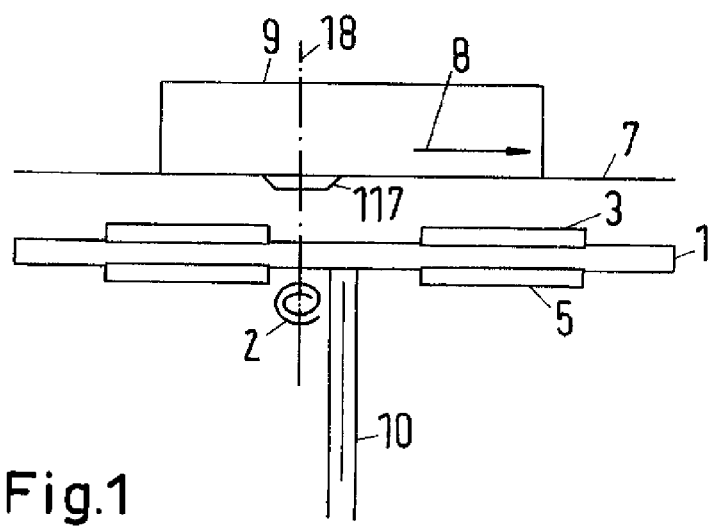

(51) Int. Cl.
*H01Q 3/24* (2006.01)
*H01Q 9/28* (2006.01)
*H04M 1/04* (2006.01)
*H04W 88/06* (2009.01)
*H02J 7/02* (2006.01)
*H04M 1/60* (2006.01)

(52) U.S. Cl.
CPC ............... *H01Q 9/285* (2013.01); *H02J 7/025* (2013.01); *H04B 5/0031* (2013.01); *H04M 1/04* (2013.01); *H04M 1/6075* (2013.01); *H04W 88/06* (2013.01)

(56) References Cited

U.S. PATENT DOCUMENTS

| | | |
|---|---|---|
| 2007/0008233 A1 | 1/2007 | Strauss et al. |
| 2011/0164471 A1* | 7/2011 | Baarman et al. ............... 368/10 |
| 2012/0214462 A1* | 8/2012 | Chu et al. ...................... 455/418 |

FOREIGN PATENT DOCUMENTS

| | | |
|---|---|---|
| WO | WO-2004/095634 A2 | 11/2004 |
| WO | WO-2007/118694 A1 | 10/2007 |

* cited by examiner

COUPLING AN ELECTRONIC APPARATUS HAVING A RADIO LINK, IN PARTICULAR A MOBILE TELEPHONE, TO DEVICES OF A MOTOR VEHICLE

The invention relates to a configuration for the wireless coupling of a radio apparatus, in particular a mobile telephone, via a radio link, in particular to a device of a motor vehicle or to a stationary radio device. The invention relates further to a corresponding method for coupling a radio apparatus across a radio link and a method for the production of the configuration.

The coupling serves, in particular, radio signals transmitted by radio waves in the mobile radio frequency range that is approximately between 500 MHz and 3 GHz. The coupling in particular enables establishing within a motor vehicle a line connection to an outside antenna of the motor vehicle, which, in turn, is capable of establishing and maintaining a radio link to a mobile radio network. Yet the coupling can also establish within a motor vehicle a connection to other devices, for example, to a hands-free speaking configuration for the mobile telephone.

By radio apparatus is understood an apparatus with the capability of communicating across a radio interface with a remotely located station while being moved. The apparatus does not need to include, as is the case in a mobile telephone, a keypad and does not need to be suitable for transmitting operation as well as also receiving operation. For example, the radio apparatus can be a mobile emergency transmitter which upon the touch of a button sends an emergency signal to the station. Other radio apparatus for which the invention can provide a wireless coupling are, for example, so-called Sticks which are connected across a wire-bound interface to an apparatus, such as, for example, a computer, and which includes a radio transmitter in order to connect the apparatus to a radio receiver or a radio network. Such Sticks have recently come into use in particular for linkage to UMTS (Universal Mobile Telecommunication System) radio networks. However, such Sticks are also utilized for linkages to other radio networks. Utilizing the configuration according to the invention, in particular, such Sticks, but also mobile telephones and other radio apparatus, can be coupled, for example to a line to a stationary device (for example to a more powerful radio antenna with amplifier) within buildings.

WO 2007/118694 A1 describes a configuration for coupling a mobile telephone to devices of a motor vehicle, wherein the mobile telephone is coupled wirelessly to an antenna structure of the motor vehicle. The antenna structure can be a helical antenna. Thereby that the antenna structure has a shape that at a scale change remains unchanged and thar for various signal frequencies structure elements of the antenna structure are available, a broadband coupling is enabled, e.g. radio waves in a broad frequency range can be transmitted. The antenna structure can be a flat, substantially two-dimensional structure, with the mobile telephone antenna being located at a short spacing from the antenna structure and therewith in the near field of the antenna structure.

With the exception of the helical antenna structure, the configuration according to the present invention can comprise the above listed features. In addition, the space in which the radio apparatus is located during the coupling can also be realized in the present invention as described in the WO 2007/118694 A1, for example as a tub-shaped space.

With respect to an embodiment example of a holder, a configuration is mentioned in WO 2007/118694 A1 for the inductive (wireless) charging of an energy store that is a component of the mobile telephone.

By inductive charging is understood that energy in the form of electromagnetic waves or fields is transmitted to the electronic apparatus and is received here, for example, by a coil or antenna and introduced into the energy store.

The radio link between the electronic apparatus and devices of the motor vehicle can serve different purposes. It is also feasible to establish and operate, at least temporarily, several such radio links in parallel. As already described in WO 2007/118694 A1, one of these radio links serves for coupling the radio antenna of the radio apparatus to the antenna of the motor vehicle. The quality of the radio link to stations external to the motor vehicle can hereby be significantly improved. Another type of radio link is one such serving for operating, in particular for controlling, the radio apparatus. For example, a hands-free speaking configuration can be connected across the radio link or a radio interface with the radio apparatus.

While the mobile telephone is located in the motor vehicle and connected across the radio link to devices of the motor vehicle, the motor vehicle can be in motion. Unless special measures are provided, the radio apparatus can therefore also move relative to the configuration for coupling. Further, it should be feasible to couple radio apparatus as different as possible with the same configuration and, as much as possible, without the use of special adapters matched to the apparatus. It should, for example be feasible to couple a Smart Phone and optionally a very small mobile telephone. Herein in each instance inductive, e.g. wireless, charging of the energy store of the electronic apparatus should be possible.

The position of the electronic apparatus relative to the charging device generating the electromagnetic fields for charging the energy store (primary side) is decisive for the effective inductive energy transmission and therewith for rapid charging of the energy store. On the other hand, there is the desire of users of the configuration not to have to move the radio apparatus into a special position using particular great dexterity. The user rather would prefer to place the electronic apparatus in the configuration in as simple a manner as possible.

DE 10 2009 033 751 A1 describes that in a configuration for the wireless coupling a substantially horizontally extending surface is provided onto which the radio apparatus can be placed for coupling, e.g. for the establishment of the radio link as well as also for the inductive charging. The configuration includes a support surface for the placement of the electronic apparatus such that the emplaced electronic apparatus is coupled via the radio link or that at least in the emplaced position a radio link can be established. In order to retain the mobile telephone in an optimum position even under the effect of external forces, such as can occur during accelerations or decelerations of the motor vehicle, the support surface includes a recess rotationally symmetric about an axis extending perpendicularly with respect to the support surface, into which recess engages a projection of the radio apparatus formed correspondingly to the rotationally symmetric recess.

DE 10 2009 033 751 A1 therefore enables holding the radio apparatus in the optimum position for the inductive charging. However, the rotationally symmetric recess restricts the possibilities of disposing a radio apparatus in any arbitrary position within a larger range of possible positions and to couple it wirelessly. If an inductive charging should at least temporarily not be required or not desired, the rotationally symmetric recess complicates the handling for the user. However, if a radio apparatus includes only on one side a projection corresponding to the rotationally symmetric recess, the radio apparatus can be emplaced with its other side and is subsequently free of positioning restrictions. Radio apparatus could also be emplaced that do not have any rotationally symmetric projection.

Added to this is the fact that a charging coil, generating on the so-called primary side the electromagnetic field which generates on the side of the radio apparatus (secondary side) an electric voltage through induction, interferes with antennas that serve for the wireless coupling of the radio apparatus across a radio link. In particular, through the charging coil the attenuation is increased which a radio link undergoes under wireless coupling between the antenna on the primary side and the radio antenna of the radio apparatus on the secondary side. This applies even when the charging coil is not being operated.

One problem addressed by the present invention is specifying a configuration and a method of the previously stated type which permits a user to couple a radio apparatus wirelessly in simple manner, wherein it is to be feasible to charge inductively the radio apparatus during the establishment of the wireless coupling as well as also to omit charging.

As a solution is proposed that, similarly to the above described support surface, at least one abutting surface is provided for disposing the radio apparatus so as to abut on the abutting surface. If the abutting surface extends approximately in the horizontal direction, this surface is a support surface. However, the abutting surface can also extend approximately vertically or differently and the radio apparatus in this case, is pressed, for example by a press-on arrangement onto the abutting surface. The abutting surface is preferably level. The radio apparatus can in particular be a radio apparatus with a circuit board on which a radio antenna or a plurality of radio antennas, in particular as strip lines, is disposed. Conventionally a ground surface is further provided such that the directional radio pattern of the radio antenna(s) on the one side of the circuit board differs from the directional radio pattern of the antenna on the other side of the circuit board. On the one side of the circuit board the sensitivity of the antenna or the intensity of the electromagnetic waves radiated by the antenna is greater than on the other side. For example, in a mobile telephone the circuit board is disposed such that the sensitivity/intensity of the waves is greater on the side facing away from the ear of the user than on the side facing the ear when the user holds the telephone in his hand and places it in the proximity of his ear in order to be able to conduct a telephone call. At the transition of the half-spaces corresponding to the first side and the second side of the circuit board, there is conventionally found a local minimum of the sensitivity/intensity of the radiated waves. Such a radio apparatus is preferably disposed so as to abut on the abutting surface such that the side with the higher sensitivity/intensity of the radiated electromagnetic waves faces the abutting surface. The circuit board can in particular extend parallel or approximately parallel (for example maximally at an angle of 3°) to the abutting surface, if the latter is level.

Correspondingly to the DE 10 2009 033 751 A1, the abutting surface includes also a rotationally symmetric recess and a primary-side charging coil for the inductive charging of an energy store of the radio apparatus is provided. The magnetic flux density is herein maximal in the direction of the rotational axis. By rotationally symmetric is understood that the recess through an imaginary or actual rotation about its rotational axis, wherein the rotation is not a complete revolution, can be mapped identically or nearly identically onto itself. To this definition correspond, for example, regular polygons, pentagons, hexagons, etc. Specifically is also understood by rotationally symmetric that the recess through an imaginary rotation about any arbitrary angle about its rotational axis can be mapped onto itself. The recess in this case has therefore a circular outer contour.

In addition, the configuration has, however, at least one antenna (which can also be referred to as coupling antenna) for the wireless coupling of the radio apparatus. The at least one antenna comprises an electrically conductive coating which forms an antenna structure in order to enable the wireless coupling. The electrically conductive coating is supported by a substrate of electrically non-conductive material, extends along the abutting surface and is preferably disposed at a smaller spacing from the abutting surface than the charging coil. The charging coil is preferably not disposed closer to the abutting surface than the nearest electrically conductive regions of the antenna or antennas. Therefore, in the case of plate-shaped substrates, for example, the large-area surfaces of which extend approximately parallel to the abutting surface, as is the case in a printed circuit board, it is preferred not to dispose the charging coil as a discrete component on the surface of the substrate closer to the abutting surface. In one realization the charging coil is disposed as a configuration of tracks on the closer surface of the substrate. In another realization the charging coil is disposed as a discrete structural part in a recess (for example a milled-out notch) in the closer surface of the substrate. Thereby that the charging coil, in line of sight from the closer surface of the substrate, does not extend further in the direction of the abutting surface than the antenna or antennas, the antennas can be disposed at an especially small spacing from the abutting surface, for example at a distance of 2 to 8 mm, in particular 2 to 5 mm. Hereby good coupling to the radio antenna of the radio apparatus is enabled. In view of the fact that with currently conventional structural forms of radio antennas, for example in mobile telephones, changes in the coupling to the radio stations and/or antennas can already be effected by the hand or finger of the operator, the especially close disposition of the coupling antenna or coupling antennas is of great advantage. The electrically conductive coating therefore preferably extends at the same or at a lesser distance from the abutting surface than the charging coil. If here a distance of the charging coil and the antennas from the abutting surface is discussed, the recess is not taken into consideration. If therefore, for example, with the exception of the recess, the abutting surface is level, the distance from the plane of the level abutting surface is considered.

One antenna or several of the antennas can each be formed by several such electrically conductive coatings, wherein the plurality of the coatings overall forms the antenna structure. In particular the substrate can be a plate-shaped substrate (for example the above cited circuit board) on the one side of which the electrically conductive coating of the antenna or antennas is disposed and on the opposite side of which, further removed from the abutting surface, the charging coil is disposed. For example the electrically conductive coating or coatings of the at least one antenna can extend in a spatial region delimited by two planes parallel with respect to one another, which are parallel to the abutting surface.

It is in particular feasible to position a plurality of the antennas (e.g. of the coupling antennas) one next to the other and the antennas are selectively operable to establish and maintain the wireless coupling of the radio apparatus. In particular, this makes it possible to dispose the radio apparatus in any arbitrary position and orientation on the abutting surface and to operate via the selected radio antenna a radio link at low attenuation. It is, however, also feasible to attain this using a single antenna.

Thereby that the electrically conductive coating of the at least one antenna is located closer to the abutting surface than the charging coil, between the at least one antenna and the radio antenna of the radio apparatus a near field coupling can be operated which is only minimally impaired by the charging coil even if the radio antenna is located in the proximity of the rotational axis of the rotationally symmetric recess. This applies in particular when the energy store is not being charged inductively, e.g. when the charging coil is currentless. In particular, one of the antennas or the antenna can even be located between the charging coil and the radio antenna of the radio apparatus. Since the antenna is formed by an electrically conductive coating which, as a rule (as is the case with electric tracks of printed circuit boards) is thin, an antenna of the configuration positioned such does not hinder the inductive charging in any substantial manner. One reason lies therein that the coating can be permeated by the magnetic field generated for the purpose of inductive charging. However, it is preferred for the rotational axis of the recess to penetrate a region of the antenna structure in which there is no electrically conductive material of the coating. It is, in addition, preferred for the antenna located between the charging coil and the radio antenna not to be connected to reference potential (for example ground) when this antenna is not operated yet inductive charging is taking place via the charging coil.

It is thus feasible to position the radio apparatus within a space defined by the configuration in any arbitrary position and orientation in contact with the abutting surface and herein, moreover, either to carry out inductive charging or not. The radio antenna of the radio apparatus can in any case be wirelessly coupled to the antenna of the configuration or to a selected antenna of the configuration and across this coupling a radio link can be operated. Depending on the orientation and positioning of the radio apparatus and depending on whether or not inductive charging takes place, the coupling attenuation can fluctuate. It is however preferred for the antenna or the antennas to be realized such that the coupling attenuation does not lead to quality losses for the user during normal operation of the radio apparatus. In particular, the fluctuation of the coupling attenuation due to different positioning and orientation should be lower than the variation of the coupling attenuation which occurs when docking different commercially available mobile telephones each in the best possible position and orientation.

A coupling attenuation which, as described previously, can fluctuate without quality losses occurring during the operation of the radio apparatus via the wireless coupling, is referred to as substantially the same coupling attenuation. In particular, coupling attenuations are substantially identical if the signal strength, which conventionally is displayed in mobile telephones in up to six steps, is at the same step or in the border region of two steps.

Alternatively, a given maximum value of the coupling attenuation is not exceeded over the entire range of possible positions and orientations of the radio apparatus while it abuts on the abutting surface. The maximum value can be given in particular with respect to a specific type of radio apparatus. For different types, different maximum values can be given.

Proposed is in the particular the following: a configuration for the wireless coupling of a radio apparatus, in particular of a mobile telephone, via a radio link, in particular to a device of a motor vehicle or to a stationary radio device, wherein
  the configuration comprises an abutting surface for disposing the radio apparatus so as to abut on the abutting surface,
  the configuration comprises an antenna to establish and maintain the wireless coupling of the radio apparatus or comprises a plurality of antennas positioned one next to the other which are selectively operable to establish and maintain the wireless coupling of the radio apparatus,
  the abutting surface comprises a rotationally symmetric recess about a rotational axis extending perpendicularly to the abutting surface such that a radio apparatus with a projection engaging into the recess can operate at different rotational positions with respect to the rotational axis a radio link to the antenna or to one antenna of the plurality of antennas, and such that, alternatively, a radio apparatus, that does not engage into the recess however abuts on the abutting surface, can be located within a space delimited by the abutting surface and the configuration in any arbitrary orientation and any arbitrary position and can operate in each case a radio link to the antenna or to one antenna of the plurality of antennas,
  the configuration comprises a primary-side charging coil for the generation of an electromagnetic field which is receivable by a secondary-side charging device of the radio apparatus and is utilizable for charging an energy store of the radio apparatus,
  the primary-side charging coil is oriented relative to the rotational axis such that the magnetic flux density of the electromagnetic field generated by the primary-side charging coil—in comparison to the magnetic flux density of parallel axes—is maximum in the direction of the rotational axis,
  the antenna or the antennas is or are each formed by at least one electrically conductive coating, supported by a substrate of electrically non-conductive material, wherein the coating or coatings extends or extend along the abutting surface,
  the electrically conductive coating(s) of at least a portion of the antennas are disposed at a lesser or the same distance from the abutting surface than the charging coil, and
  the antenna or a first antenna of the plurality of antennas for the establishment and maintenance of a radio link with the radio apparatus is located in the proximity of the rotational axis such that via the antenna or the first antenna a radio link to a radio apparatus is operable even if the radio antenna of the radio apparatus abuts on the abutting surface is intersected by the rotational axis. In this case there applies with respect to the coupling attenuation:
  a. the radio link undergoes substantially the same coupling attenuation as corresponding other radio links between the radio antenna of the radio apparatus and the antenna or another selected antenna of the plurality of antennas if the radio apparatus would also abut on the abutting surface, however positioned and/or oriented differently, and/or
  b. the coupling attenuation of the radio link does not exceed a maximum value given for the entire range of possible positions and orientations of the radio apparatus while it abuts on the abutting surface.

This is founded on the concept that radio apparatus with a secondary-side charging device are conventionally realized such that the radio antenna of the radio apparatus is located at a distance from the rotational axis if the projection of the radio apparatus engages into the recess or, expressed differently, if the secondary-side charging device is located and oriented optimally with respect to the primary-side charging coil. However, if the radio apparatus is not to be charged, it can be located in nearly any arbitrary position and orientation within a spatial region defined by the configuration and herein abuts on the abutting surface. It can herein occur that the radio antenna of the radio apparatus is disposed in a spatial subregion of the overall possible region in which during a charging process at optimum orientation of the secondary-side charging device, this secondary-side charging device would be disposed. In the consideration of this configuration, different distances of the charging device and the radio antenna from the abutting surface are disregarded, e.g. a plan view onto the abutting surface is considered.

Therefore, in particular with respect to the coupling attenuation of the possible radio links between the radio antenna of the radio apparatus, on the one hand, and the antenna or one antenna of the plurality of the antennas, on the other hand, the following can apply:
  a. the radio link between the radio antenna and the antenna or one other antenna of the plurality of antennas at any arbitrary position and/or orientation of the radio apparatus relative to the configuration undergoes substantially the same coupling attenuation when the radio apparatus is docked on the contact surface, independently of whether or not the projection engages into the recess and/or
  b. the coupling attenuation of the radio link does not exceed a maximum value given for the entire range of possible positions and orientations of the radio apparatus while it abuts on the abutting surface, independently of whether or not the projection engages into the recess.

The same can also apply to the following methods (operation and/or production).

Further, a method is proposed for the wireless coupling of a radio apparatus, in particular of a mobile telephone, via a radio link in particular to a device of a motor vehicle or to a stationary radio device, wherein
  the radio apparatus abuts on a abutting surface,
  the abutting surface includes a rotationally symmetric recess about a rotational axis extending perpendicularly to the abutting surface, wherein for disposing a radio apparatus so as to abut on the abutting surface a projection of the radio apparatus is introduced into the recess and one of several possible different rotational positions with respect to the rotational axis is set or, alternatively, the radio apparatus or another radio apparatus within a space delimited by the abutting surface and optionally by further parts of a coupling configuration abuts on the abutting surface in any arbitrary orientation and any arbitrary position,
  between a radio antenna of the abutting radio apparatus and an antenna disposed on the abutting surface a radio link is operated or between the radio antenna of the abutting radio apparatus and a selected antenna selected from a plurality of antennas positioned one next to the other along the abutting surface a radio link is operated, wherein also in the other rotational positions or in other orientations and positions a radio link between the radio antenna and the antenna or between the radio antenna and the selected antenna or another selected antenna would be operable and, if indicated, is also operated,
  while a projection of the radio apparatus is located in the recess, a secondary-side receiving device of the radio apparatus is inductively supplied with energy from a primary-side charging coil of the configuration through an electromagnetic field while the radio link is operated, wherein the primary-side charging coil is oriented relative to the rotational axis such that the magnetic flux density of the electromagnetic field generated by the primary-side charging coil—in comparison to the magnetic flux density of parallel axes—is maximum in the direction of the rotational axis,
  if no receiving device of the radio apparatus is inductively supplied with energy from a primary-side charging coil of the configuration through an electromagnetic field and if the radio antenna of the radio apparatus is located in the proximity of the rotational axis, the radio link is operated via the sole antenna or a selected antenna of the plurality of antennas is selected for the operation of the radio link, wherein the selected antenna is also located in the proximity of the rotational axis, wherein
  a. the radio link undergoes substantially the same coupling attenuation as corresponding other radio links between the radio antenna of the radio apparatus and the antenna or another selected antenna of the plurality of antennas if the radio apparatus would also abut on the abutting surface but differently positioned and/or oriented, and/or
  b. the coupling attenuation of the radio link does not exceed a maximum value given for the entire range of possible positions and orientations of the radio apparatus while it abuts on the abutting surface.

Moreover, a method is proposed for the production of a configuration for the wireless coupling of a radio apparatus, in particular of a mobile telephone, via a radio link in particular to a device of a motor vehicle or to a stationary radio device, wherein
  a abutting surface is provided for abutting the radio apparatus,
  an antenna is provided to establish and maintain the wireless coupling of the radio apparatus or along the abutting surface a plurality of antennas is disposed positioned one next to the other, which are selectively operable in order to establish and maintain the wireless coupling of the radio apparatus,
  in the abutting surface is provided a rotationally symmetric recess about a rotational axis extending perpendicularly to the abutting surface such that a radio apparatus with a projection engaging into the recess at different rotational positions with respect to the rotational axis can operate a radio link to the antenna or to one antenna of the plurality of antennas and such that, alternatively, a radio apparatus that does not engage into the recess but abuts on the abutting surface, can be located within a space delimited by the abutting surface and by the configuration in any arbitrary orientation and any arbitrary position and can in each instance operate a radio link to the antenna or to one antenna of the plurality of antennas,
  a primary-side charging coil is provided for the generation of an electromagnetic field that can be received by a secondary-side charging device of the radio apparatus and is utilizable for charging an energy store of the radio apparatus,
  the primary-side charging coil is oriented relative to the rotational axis such that the magnetic flux density of the electromagnetic field generated by the primary-side charging coil—in comparison to the magnetic flux density of parallel axes—is maximum in the direction of the rotational axis,
  the antenna or the antennas is or are each formed by electrically conductive coatings supported by a substrate of electrically non-conductive material,
  the electrically conductive coatings of at least a portion of the antennas are disposed at a lesser or equal distance from the abutting surface than the charging coil, and
  the antenna or a first antenna of the plurality of antennas for the establishment and maintenance of a radio link with the radio apparatus is disposed in the proximity of the rotational axis such that via the antenna or the first antenna a radio link to a radio apparatus is operable while the radio apparatus abuts on the abutting surface, wherein its radio antenna is intersected by the rotational axis, and wherein a. the radio link undergoes substantially the same coupling attenuation as corresponding other radio links between the radio antenna of the radio apparatus and the antenna or another selected antenna of the plurality of antennas if the radio apparatus would also abut on the abutting surface but positioned and/or oriented differently, and/or b. the coupling attenuation of the radio link does not exceed a maximum value given for the entire range of possible positions and orientations of the radio apparatus while it abuts on the abutting surface.

The rotationally symmetric recess can in particular have the features described in DE 10 2009 033 751 A1.

The abutting surface is preferably formed of a synthetic material that makes slipping of an apparatus surface difficult, however does not prevent it completely, in order for the projection of the electronic apparatus to be able to slip again into the recess when the abutting surface extends approximately in the horizontal direction.

It is preferred for the primary-side charging coil to be combined with a detection device realized to detect that the charging coil emits an electromagnetic power which is received by a secondary-side device of the radio apparatus and converted into electric power. For example, the detection device can in this case generate a signal that leads to a visual display and/or audible indicator. The user can therewith be informed of the functioning of the charging of the energy store. The detection device can, for example, measure, or detect in another manner known per se, the electric power absorbed by the charging coil.

The device for the inductive charging of the energy store of the radio apparatus comprises the primary-side charging coil. In order not to increase the coupling attenuation of the particular radio link between the antenna or one of the antennas of the configuration and the radio antenna of the radio apparatus, the charging device does, however, not comprise, except if indicated the material of the line of the coil and its electric terminals, any additional permanent magnetic materials or ferromagnetic materials. The material of the line of the coil and its electric terminals is preferably also not permanently magnetic or ferromagnetic. Except for the charging coil proper, which, due to electric current flow, generates the field which in the secondary-side receiving device of the radio apparatus induces a voltage, the charging device therefore does not comprise any further materials which change the field magnetically or through electric current flow with respect to the effect attained on the secondary side.

The charging coil can be, for example, windings of a single electric line or of electrically parallel lines (for example of copper wire). The windings extend in particular approximately circularly about the rotational axis.

In order to enable, on the one hand, effective rapid charging of the energy store of the radio apparatus and, on the other hand, not to interfere with the radio link between the antenna or one of the antennas, on the one hand, and the radio antenna of the radio apparatus, on the other hand, it is preferred for the charging coil to be operated by applying and operating an AC voltage at a frequency that is at least by a factor 10 below the minimally feasible radio frequency for mobile telephones. The frequency of the AC voltage of the charging coil therefore is preferably maximally 50 MHz.

In addition, there are legal provisions regarding the generation of electromagnetic fields that must be observed. The frequency is therefore, for example, in the range between 1 and 10 kHz. However, given the appropriate realization it can be attained that even at higher frequencies the limit values for the emission of electromagnetic radiation can be underrun.

The radio apparatus is intended to abut as much as possible in all areas on the abutting surface that, based on the dimensions of the radio apparatus, are possible. The coupling attenuation is herein to be as much as possible independent of location or at least not vary by orders of magnitude. Another desirable property is a broadband coupling behavior, which at low coupling attenuation is as much as possible also attainable over the entire level surface. It becomes therewith feasible in practice to couple radio apparatus in various frequency ranges. It becomes subsequently feasible to efficiently couple on radio apparatus having highly different dimensions. Radio apparatus with dimensions that are small relative to the surface of the substrate can subsequently be disposed on the abutting surface over a relatively large region at different positions and different orientations. The position and orientation of relatively large radio apparatus can vary at least over a smaller range.

Through different positions and orientations the location, for example in the case of mobile telephones, changes at which the mobile telephone antenna is located above the, for example, level abutting surface. It is therefore one objective to implement the antenna(s) such that the coupling of the radio apparatus is low and/or varies as little as possible at all possible positions and/or with all possible orientations.

The planar (layer like) antenna structures can be produced in particular as is known per se in the case of printed circuit boards.

Alternatively, or additionally, the antennas can comprise electrically conductive strips which are applied on the plate-shaped substrate of electrically non-conductive material. These antennas are in this case so-called strip antennas. Said coatings are in this case structured in the form of strips. This permits, on the one hand, formations with the desired coupling properties with respect to frequency and coupling attenuation and, one the other hand, disposing a charging coil from the view of the radio apparatus in a position and at an orientation in which the rotational axis penetrates a region devoid of electrically conductive materials of the antennas.

Following are realizations of antenna structures. First, a structure with two different electrically conductive coatings will be described. The configuration can, however, alternatively comprise several such antenna structures, wherein, for example in the planes of the two coatings further electrically conductive areas are provided that belong to different antenna structures. Subsequently, a structure with at least one electrically conductive coating will be described. The configuration can comprise several such structures, for example in one or several planes.

According to a first realization, the electrically insulating substrate comprises a first level surface and a second level surface located on the opposite side of the substrate, which second level surface extends parallel to the first surface. On the first surface an electrically conductive coating is applied which, during operation of the antenna as a coupling antenna, emits and/or receives radio waves to or from a radio antenna of the radio apparatus and thereby couples the radio apparatus. The coating comprises a first area which comprises a convex outer margin. The first area is connected across a preferably straight connection line, implemented as a strip line, which connection line is a portion of the coating, electrically conductingly with a first contact of a terminal for connecting the high-frequency line, wherein the strip line extends from the convex outer margin up to a margin region of the substrate. A second electrically conductive coating is applied on the second surface which includes a second area comprising a convex outer margin. The region of the second electrically conductive coating that includes the second area is applied on a subregion of the second surface, wherein, in line of sight from the subregion, on the opposite side of the substrate the strip line is applied on the first surface. The second area is connected electrically conductively with a second contact of the terminal.

During operation of the antenna structure the first area and the second area therefore function each as a ground surface or reference surface for the other area. In addition, the second area functions as a ground surface of the strip line. The first and the second contact are connected to separate conductors, insulated against one another, of a high-frequency line.

In particular, in plan view onto the first or second surface, the convex outer margins of the first and the second area face one another. Therefore, in plan view there is a region between the convex outer margins, wherein the spacing between the convex outer margins varies in the region. Stated differently, there is a shorter spacing and there are spacing lines between other points of the different outer margins which have greater length.

Due to the two different areas on the opposite sides of the substrate, which each represent an antenna structure, a wireless coupling to an antenna of the radio apparatus is enabled over a large region of the surface of the substrate. In particular if the first area and the second area are formed mirror-symmetrically (viewed in a plan view onto one of the level surfaces of the substrate, wherein the plan view also considers the structures applied on the underside), there is on each of the opposite sides of the mirror axis a region which effects wireless coupling at the same properties (frequency range as well as coupling attenuation) if the antenna of the radio apparatus is disposed thereabove. Herein the, in each instance, other area forms the reference surface, wherein the reference surface is likewise structured and in this manner, there is thereabove no region in which the coupling takes place with markedly increased coupling attenuation. As a result, overall a large areal region over the surface of the substrate is available for wireless coupling at low coupling attenuation.

The strip line herein does not hinder the coupling or only insignificantly when the antenna of the radio apparatus is positioned over the strip line. The strip line is preferably realized through a straight-line strip which, under consideration of the electric properties of the substrate material and the dimensions of the substrate material as well as of the strip line, has a defined preset impedance of, for example, 50 Ω.

In one realization the first area and/or the second area has a continuously encompassing convex outer margin which, however, optionally is discontinuous by at least one narrow spared strip. However, the outer margin is substantially continuously encompassing. For example, the encompassed area is a circle, an oval or an ellipse. Through the selected form of the areas and the associated reference surfaces, over at least one broad frequency range a low coupling attenuation is attained. Furthermore, in the broad frequency range only minimal impedance changes occur. The configuration can therefore be referred to as broadband. Therewith resonances with respect to radio waves are attained in a relatively large frequency range. The internal dimensions of the area herein determine the wavelengths, and therewith the frequencies, at which low-loss coupling is possible.

In a plan view onto the first or second surface of the substrate, the first area and/or the second area is preferably formed symmetrical with respect to an axis of symmetry. The axis of symmetry herein extends in particular in the direction of the longitudinal axis of the strip line, if the latter is implemented as a straight strip line. By longitudinal axis is understood the axis in the longitudinal direction of the strip line and in the middle of the strip line. The second area, applied on the opposite second surface of the substrate, has herein an axis of symmetry that extends parallel to the longitudinal axis of the strip line. For example the axis of symmetry could be obtained by shifting the longitudinal axis of the strip line in the vertical direction on the second surface. Such a symmetric formation of the first area and/or the second area leads to the fact that the antenna of the radio apparatus can be displaced in directions transversely to the axis of symmetry and herein substantially the same properties of the coupling are retained.

In a preferred further development within the symmetrically formed area, two strips extending parallel to the longitudinal axis are spared of the electrically conductive material of the area, wherein the strips preferably extend symmetrically on opposite sides of the longitudinal axis. Through such spared strips additional resonances for radio waves are created which lead to the antenna structure being also suitable for coupling in a second frequency band at low values of coupling attenuation.

In particular each of the strips can terminate at one of its ends at a spacing from the convex outer margin of the area and at its other end discontinue the continuous encompassing margin of the area over a length that corresponds to the width of the strip. Therefore a continuous electrically conductive coating within the area remains. The width of the spared strip is so narrow that in the frequency band or frequency range with the shorter wavelengths (e.g. with the higher frequencies) the strip has no significant effect on the coupling attenuation. Stated differently, the width of the strip is very much narrower than the shorter wavelengths of the radio waves such that the strip is without substantial effect for the radio waves with the relatively short wavelengths. In contrast, at significantly longer wavelengths, e.g. lower frequencies, further resonances form at which the spared strips are of significance.

In a variant of the configuration the first area and the second area are not applied on the opposite sides of the substrate but rather on the same side, namely on the first level surface. Both areas have a convex outer margin. With their convex outer margins the areas are connected to the high-frequency line via a balun. In this manner the two areas form the different poles of a dipole antenna. They are driven in phase opposition. For the matching to the impedance of the high-frequency a balun with transformer can also be utilized which effects an impedance transformation.

As described, the balun enables the disposition of the first and the second area on the same surface of the substrate. This simplifies the production. It is also feasible to dispose the antenna of the radio apparatus, at the same distance from the surface of the substrate, precisely at the same distance, if indicated, above the first area and the second area. If, for example, a support surface for emplacing the radio apparatus extends at constant distance from the level surface of the substrate, the distance from the antenna of the radio apparatus to the two areas is precisely equal if the radio apparatus antenna is disposed either above the first area or the second area.

With respect to the realizations and further developments of this variant the same applies as for the above described antenna structure, with the exception that on the opposite side of the second area no strip line is provided. However, the balun can be connected in each instance via a short strip line to the convex outer margin of the two areas. The above cited longitudinal axis or axis of symmetry extends herein, for example, in the center of the substrate surface between two parallel outer margins of the substrate.

Alternatively to a balun, for the connection of a connection line the first and the second area can also be connected directly to the several electric contacts of a terminal.

The charging coil is preferably disposed in a region such that the rotational axis (e.g. the axis with the highest magnetic flux, see above) does not penetrate one of the electrically conductive areas. The charging coil is located, for example, in a region such that the rotational axis penetrates approximately centrally the clearances between the two electrically conductive areas of the antenna structure. If, as is preferred, the convex outer margin is not formed such that it is continuously encompassing, e.g. the first area and/or the second area does not have, as is the case in a circle, an oval or an ellipse, a continuously encompassing convex outer margin, the charging coil can also be located in a region such that the rotational axis penetrates a region of the first area and of the second area devoid of electrically conductive material, which region is located, for example, between concave outer margins and/or straight outer margins.

According to a second realization, another antenna structure for the wireless coupling of a radio apparatus to a high-frequency line is proposed, wherein the configuration comprises an electrically insulated substrate which includes at least one first level surface, on the first surface an electrically conductive coating is applied which, during the operation of the configuration as a coupling antenna, emits and/or receives radio waves to or from a radio antenna of the radio apparatus and thereby couples the radio apparatus, the coating includes a first area which comprises a convex outer margin and a concave inner margin extending within the convex outer margin, such that a region within the concave inner margin is spared.

By concave inner margin is understood an inner margin that traces out an infolding or a region extending into the area of electrically conductive material, which region is not formed by electrically conductive material. The convex outer margin and the concave inner margin extend, in particular, at least over a portion of their longitudinal extent, next to one another such that between them a strip-shaped region of the electrically conductive coating is formed.

The spared region can be penetrated by the rotational axis (axis of the highest magnetic flux at inductive charging). It has been found that the spared region does not impair good coupling properties of the antenna structure. This applies in particular when, similarly as described above, the first area is connected to the high-frequency line, such that it is electrically conductive, via a straight connection line implemented as a strip line, which connection line is a portion of the coating, wherein the strip line extends from the convex outer margin up to a margin region of the substrate if the electrically insulating substrate comprises a second level surface located on the opposite side of the substrate, which surface extends parallel to the first surface, and if, as a ground surface of the first coating, a second area is applied on a subregion of the second surface, wherein, in line of sight from the subregion, on the opposite side of the substrate the strip line is applied on the first surface. This ground surface can be, for example, the second area, described above in conjunction with the first solution, with convex outer margin, in which case, again, also a concave inner margin is provided such that a region within the concave inner margin is spared. By "spared" is understood that this region does not include any electrically conductive material of the coating. However, the ground surface can also be an area that does not have a convex outer margin, for example instead—viewed in a plan view onto the second surface of the substrate—has a straight margin extending perpendicularly to the course of the straight connection line applied on the first surface.

The spared region can in particular also be utilized for the purpose of disposing a strip-shaped second antenna structure for coupling the radio waves in a second range different from the frequency range of the first area. The strip-shaped second antenna structure is herein preferably connected via the same terminal as the first area with the high-frequency line. The connection point of the first area can in particular lie at a point of an axis of symmetry of the convex outer margin. This applies not only to the solution and realization described here but also to other realizations in which the first area has a convex outer margin. In the case of a second antenna structure in the spared region, the rotational axis of the charging configuration preferably does not penetrate the electrically conductive material of either the first structure or the second structure.

The spared region is in particular utilized for creating a coupling in a second wavelength range or frequency range. A strip-shaped second antenna structure is herein especially well suited to transmit or receive radio waves with longer wavelengths, e.g. lower frequencies than is the case in the first area with the convex outer margin. The reason is that the length of the strip is decisive for the wavelength to be transmitted or to be received even if the course of the strip is not in a straight line.

The spared region is especially effectively utilized if the strip-shaped second antenna structure is realized in the form of a labyrinth or meander. The second antenna structure can additionally not only be located in the spared region within the concave inner margin but rather extend also outside of this region over the level surface of the substrate. It is in particular feasible for the strip-shaped second antenna structure to comprise a longitudinal section that extends from the spared region of the first area into a region of the first surface of the substrate outside the convex outer margin of the first area. This increases the area of the first surface over which, at good coupling quality, the coupling to an antenna of a radio apparatus is feasible. In particular if the width of the first antenna structure, formed by the width of the first area between the outer margin, is less than the width of the substrate, the region outside of the convex outer margin can be utilized for the longitudinal section or for several longitudinal sections of the strip-shaped second antenna structure. This region outside of the convex outer margin can, however, also be utilized for a second antenna structure, even if this second antenna structure does not extend within the spared region.

It is generally preferred for the antenna structures to couple radio apparatus in the near field of the antenna structure(s).

The following configuration utilizes in particular at least one of the coupling antennas of the previously described configurations. The configuration solves the problem of enabling the coupling of a radio apparatus at low coupling attenuation over as large an area as possible over the surface of the substrate.

The fundamental concept of the configuration described in the following is the use of a plurality of antennas which is selectively operated in order to establish and maintain the wireless coupling of the radio apparatus.

Each of the antennas can comprise one or several antenna structures. The antennas are disposed one next to the other. It is therefore feasible for the radio apparatus to be located in different positions and/or at different orientations and yet for one or several of the antennas to enable the wireless coupling of the radio apparatus at low coupling attenuation. It is proposed to select in each instance that antenna of the plurality of antennas via which the radio link to the radio antenna of the radio apparatus undergoes the least coupling attenuation.

The configuration with several antennas permits preferably positioning and/or orienting the radio apparatus in any desired manner within a delimited space for receiving the radio apparatus and yet to establish via at least one of the antennas a wireless coupling at low attenuation. It is proposed for the configuration to comprise:

- a plurality of antennas that are selectively operable for the wireless coupling of a radio antenna of the radio apparatus, wherein the antennas are disposed one next to the other in particular such that the radio apparatus, within a region defined by the configuration, in an arbitrary position and/or orientation relative to the plurality of antennas, is in each instance in a position and orientation in which the radio signal transmission between one of the antennas or a plurality of adjacent antennas, on the one hand, and the radio antenna of the radio apparatus, on the other hand, is subjected to lower attenuation than between the other antennas and the radio antenna of the radio apparatus, wherein the attenuation in particular is in each instance below a predetermined maximum value,
- a multiplex switch comprising a first high-frequency signal terminal for the connection of a first external connection line and connected to a plurality of internal connection lines of the configuration, via which the multiplex switch is in each instance connected to one of the antennas or a plurality of adjacent antennas, wherein the high-frequency signal terminal is selectively connected to one of the internal connection lines or to groups of internal connection lines by switching over the multiplex switch,
- a detector realized for detecting the signal strength of a high-frequency signal transmitted from one of the antennas or several of the antennas via the multiplex switch to the high-frequency signal terminal,
- a control connected to the detector and realized to switch the multiplex switch such that the antenna or the antennas with the least attenuated radio link(s) to the radio apparatus, e.g. the antenna or the antennas which transmits or transmit the high-frequency signal with the greatest signal strength to the multiplex switch, is or are continuously connected to the high-frequency signal terminal.

In particular, the maximum value of the attenuation is underrun in the entire region (for example in the region in which the radio apparatus abuts on the abutting surface) defined by the configuration, wherein there are locally, e.g. in certain positions/orientations, minima of the attenuation. However, it is not required to locate these minima since the maximum value preferably corresponds to a sufficiently low attenuation to ensure good coupling at any site in the region. The maximum value depends on the properties of the radio antenna of the radio apparatus and the antennas of the configuration as well as on at least the dimensions of the radio apparatus. The dimensions effect a minimum distance of the radio antenna from the antennas of the configuration. The region is left if the maximum value is underrun, in particular if the radio apparatus is moved beyond the margin of the abutting surface.

In particular the radio apparatus can be moved by displacement along the plurality of antennas into a position and into an orientation in which the radio signal transmission fulfills one of said conditions.

The multiplex switch is preferably in each switch position connected to only one of the antennas of the configuration. Even if the attenuation of several of the antennas is similarly low, the coupling via one of the antennas is adequate. Therefore, the alternative can be omitted, in which by switching over the switch connects the high-frequency signal terminal selectively with groups of the internal connection lines.

The antennas preferably each comprise electrically conductive strips that are applied on a plate-shaped substrate of electrically non-conductive material. In particular the above described coupling antennas are suitable for use as adjacently disposed antennas. The individual antennas of the configuration are herein preferably realized in the same manner, in particular are formed identically. However, the antennas of the configuration can be oriented differently.

The multiplex switch enables connecting the antennas selectively to that high-frequency signal terminal to which the external connection line can be connected. In order to select the best possible switching state of the multiplex switch, the configuration comprises a detector as described above. The detector can in particular be located on the side of the multiplex switch at which the high-frequency signal terminal is also located. It would also be feasible to provide a detector in one of the internal connection lines which connect the multiplex switch to the individual antennas. However, the signals supplied by the detectors are possibly not comparable without restrictions with respect to the detection results supplied by them. The effort and complexity required for a plurality of detectors and their technical signal wiring are higher.

It is therefore preferred that the control is capable of also taking into consideration the switch position assumed by the multiplex switch, e.g. which of the internal connection lines to the high-frequency signal terminal is switched through. On the basis of this information the control can detect which detection signal generated by the detector belongs to which switch position.

Preferably uniquely, each time a radio apparatus has been disposed in the region of the configuration, or repeatedly (for example at regular time intervals) by switching all possible switching states of the multiplex switch, e.g. by connecting each of the antennas successively to the high-frequency signal terminal, a determination is carried out regarding via which antenna the best possible wireless coupling to the radio apparatus, e.g. to its radio antenna, can be attained. During this test or during this detection phase, the radio apparatus is preferably operated such that during the sending of radio signals it applies a signal strength that is not variable in time. Alternatively, or additionally, the test is carried out at such speed that the signal strength of the radio signals sent from the radio apparatus does not change significantly. This is based on the findings that the different coupling attenuation for the wireless coupling to the different antennas is highly different at a certain position and orientation of the radio apparatus.

Following the detection phase or the test, the control selects that switching state of the multiplex switch at which there is the least coupling attenuation, e.g. for which the detector has detected the greatest signal strength. The control activates the multiplex switch accordingly and establishes this best switching state. This switching state is subsequently maintained, at least for a very much longer time period than the test requires, for the operation of the radio apparatus. This time period can therefore be referred to as continuous.

The detector is, for example, a structural part that is commercially available. With respect to the design of such a commercially available high-frequency signal detector, reference is made to the technical literature, for example to the publication "*Grundlagen der Hochfrequenz-Messtechnik*", *Burkhard Schiek, Bild* 1.25: *Detektor mit Zwangsanpassungswiderstand*". The publication has the ISBN 978-3-540-

64930-4. Accordingly, for the detection, for example, a Schottky diode can be utilized.

The arrangement for the inductive charging can be realized as described in DE 10 2009 033 751 A1.

Figure 2:
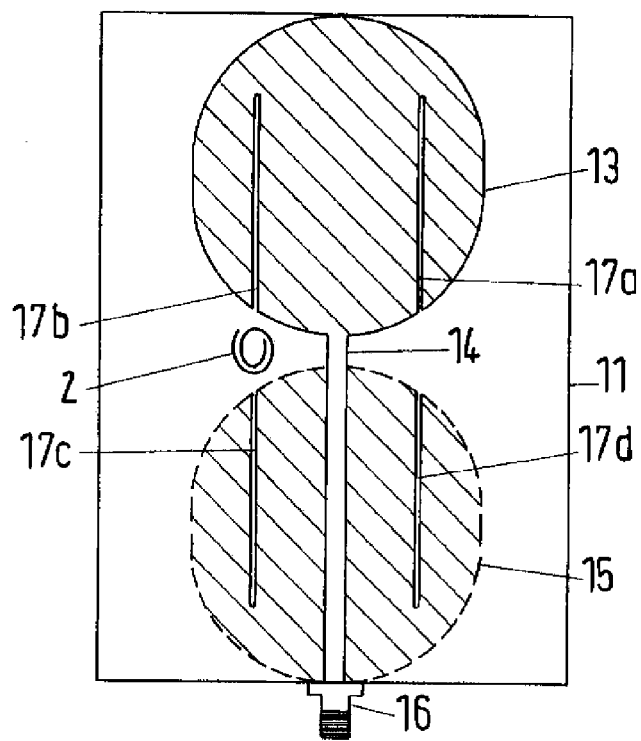
Figure 3:
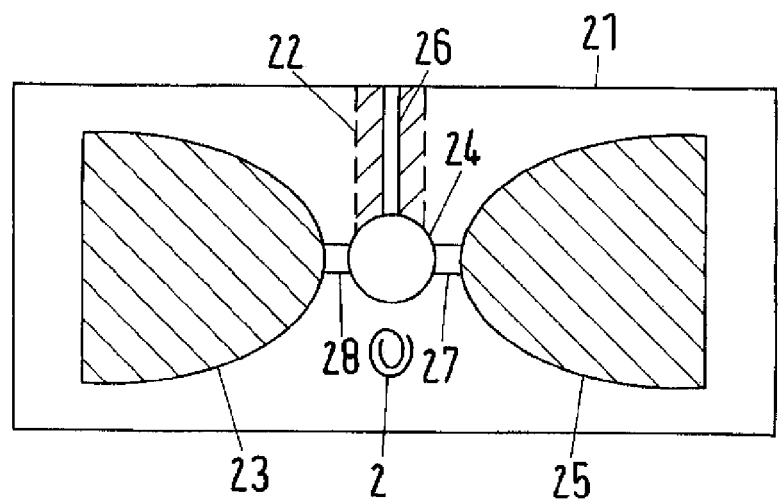
Figure 4:
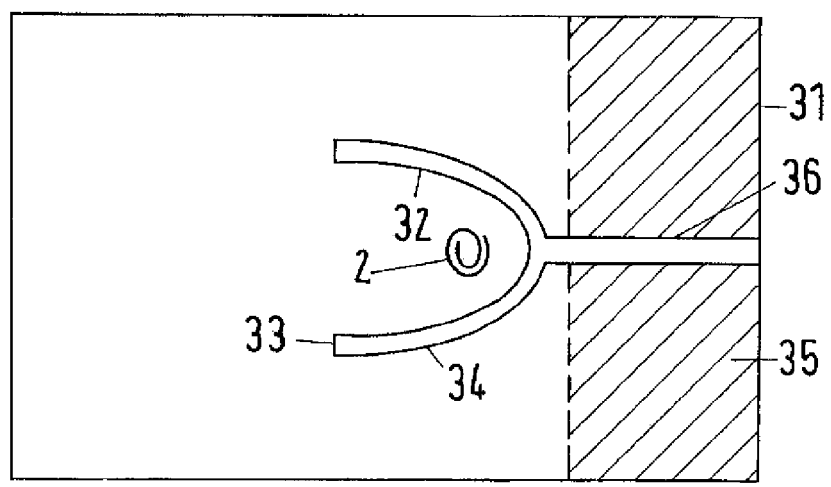
Figure 5:
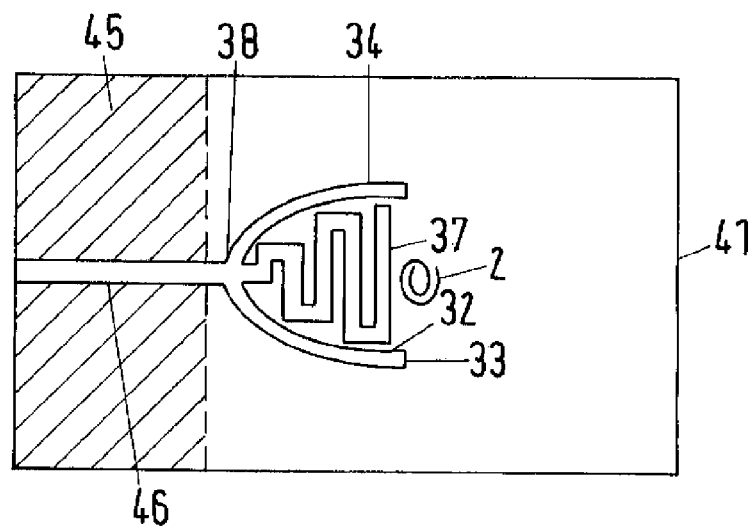
Figure 6:
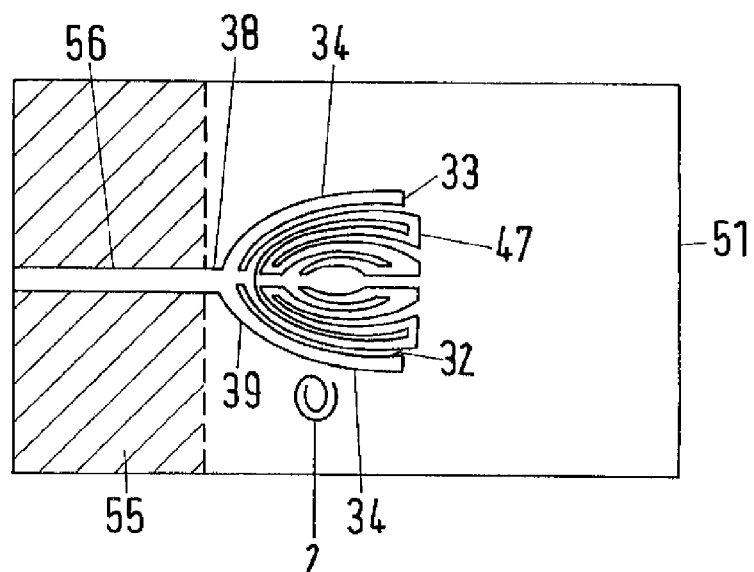
Figure 7:
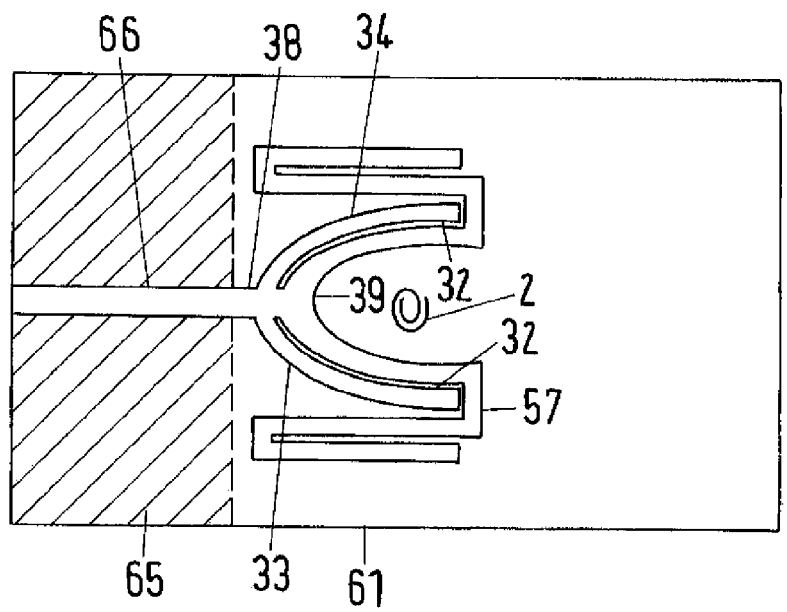
Figure 8:
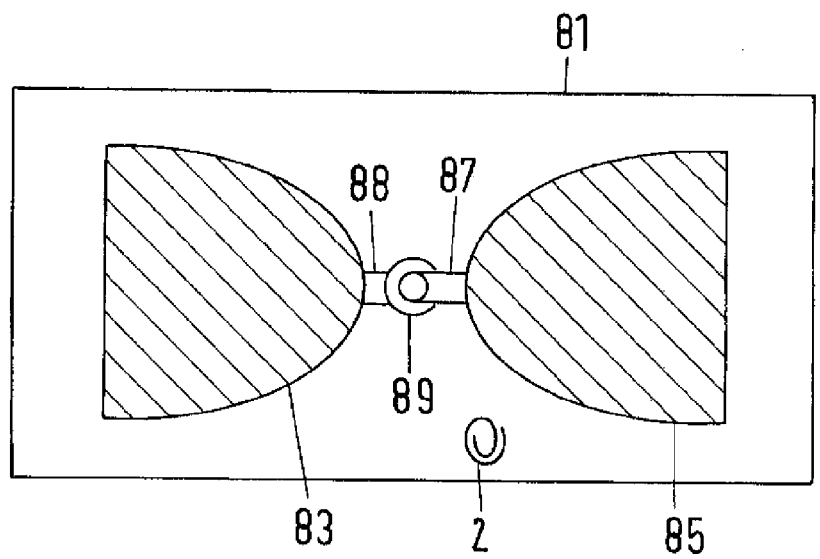
Figure 9:
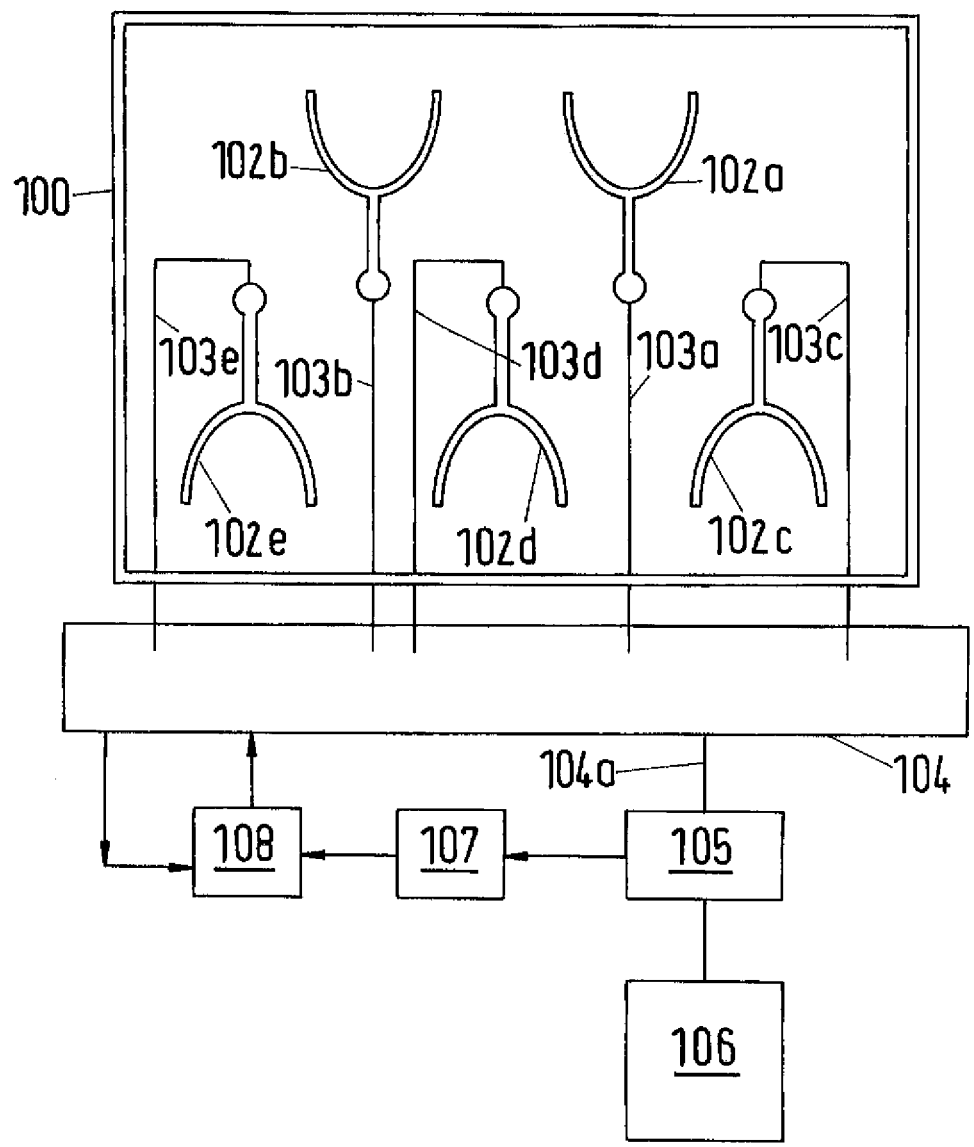
Figure 10:
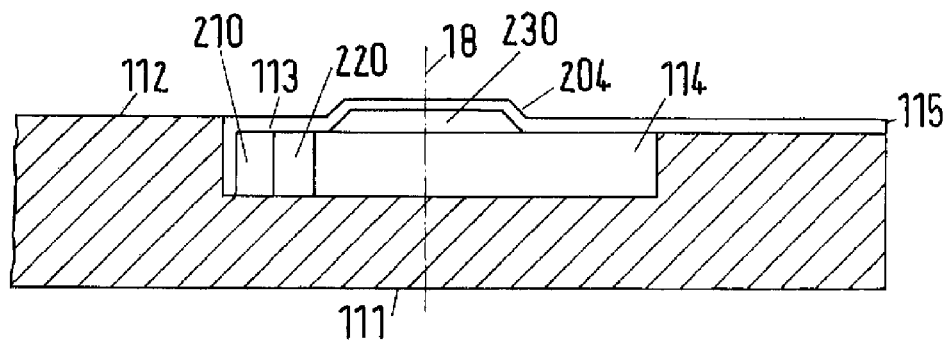
Figure 11:
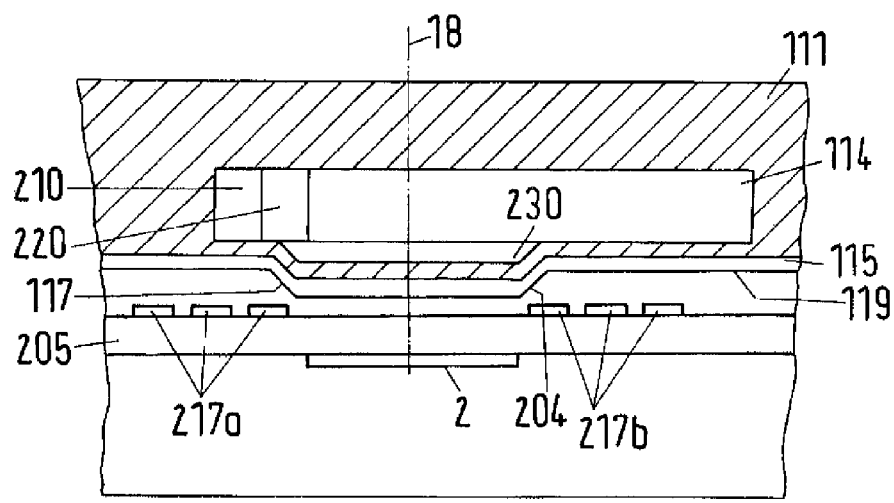
Figure 12:
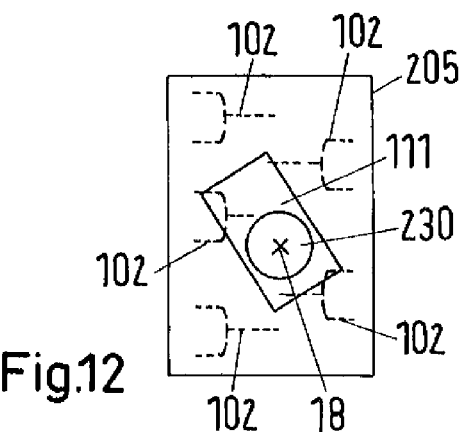

Embodiment examples of the invention will be described in the following with reference to the enclosed drawing. The individual Figures of the drawing show schematically:

FIG. 1 schematically a side view of a substrate on each of whose level surfaces, located on opposite sides of the substrate, electrically conductive planar structures are applied which thus are each located within a coating, wherein over the upper surface of the substrate on a support a radio apparatus is disposed such that between an antenna of the radio apparatus and the antenna structures applied on the surfaces of the substrate a coupling in the near field of the antennas can take place, wherein antenna signals of the radio antenna of the radio apparatus are transmitted across the antenna structures to a high-frequency line and/or conversely, FIG. 2 a top view onto a printed circuit board, on the top side of which a first electrically conductive area is applied as an antenna structure which is electrically connected via a strip line, wherein on the underside of the printed circuit board symmetrically to the first area a second area of electrically conductive material is disposed as a second antenna structure, wherein the first area and the second area form reciprocally the ground surface of the other area, FIG. 3 a top view onto a further printed circuit board, on the top side of which two electrically conductive areas disposed symmetrically with respect to one another are applied, wherein the areas are connected across a balun to the high-frequency line not shown in the Figure, FIG. 4 a further printed circuit board on the top side of which an antenna structure with convex outer margin and concave inner margin is disposed such that between the inner margin and the outer margin a strip-shaped electrically conductive region is formed, and such that in the region within the concave inner margin a spared region is generated and wherein on the underside of the printed circuit board a ground surface is disposed, FIG. 5 an antenna structure similar to that of FIG. 4, wherein however the spared region within the concave inner margin is provided with a second antenna structure in the shape of a meander, FIG. 6 an antenna structure as in FIG. 4 and FIG. 5, wherein however in the spared region a second antenna structure in the shape of a labyrinth is disposed, FIG. 7 a printed circuit board with an antenna structure as in FIGS. 4, 5 and 6, wherein in the spared region a strip-shaped second antenna structure extends, which continues into regions outside of the convex outer margin, FIG. 8 a configuration similar to FIG. 3, wherein the two antenna structures, however, are not connected across a balun but rather asymmetrically directly to a high-frequency line, FIG. 9 a configuration for the wireless coupling of a radio apparatus to a plurality of antennas disposed one next to the other, FIG. 10 a segment of a mobile telephone, wherein the housing cover at the top, beneath which a rechargeable energy store is located, includes an upwardly projecting projection in the form of a truncated cone, FIG. 11 the mobile telephone according to FIG. 10, wherein the side with the projection is directed downwardly and the projection projects into a correspondingly formed truncated cone-shaped recess of a configuration for coupling the mobile telephone to devices of a motor vehicle, wherein the mobile telephone is placed onto a support surface of the configuration, FIG. 12 a top view onto the configuration according to FIG. 11 which depicts the mobile telephone on the support surface oriented in a certain rotational position relative to the rotational axis of the truncated cone-shaped recess.

FIG. 1 shows a substrate 1, in particular a conventional, commercially available printed circuit board. On each of the opposite level surfaces of the substrate 1, which in FIG. 1 are super- and subjacent on the substrate material, are applied antenna structures as structured coating. The antenna structures above are denoted by the reference symbol 3 and the antenna structures beneath by the reference symbol 5. Above the upper antenna structures 3 is disposed a support surface 7 for placing a mobile telephone 9 or another radio apparatus thereon. The support surface 7 is carried, for example, by a, not shown, portion of a housing of the configuration and positioned at a fixed distance from the antenna structure 3. The mobile telephone 9 comprises a radio antenna 8 via which the coupling to the antenna structure 3, 5 is effected. The antenna structures 3, 5 are connected to a high-frequency line 10. In other embodiments the electrically conducting coating beneath the substrate 1, e.g. disposed on its lower surface, can be, for example, a rectangular ground surface and not a structured coating with convex outer margin. In yet a further embodiment, which will be explained in conjunction with FIG. 3, there can be no electrically conductive coating at all on the lower surface.

Beneath the substrate 1 is disposed a charging coil for the inductive charging of an energy store, not depicted in FIG. 1, of the mobile telephone 9. Devices supporting the charging coil 2 are not depicted in FIG. 1. The support surface comprises a rotationally symmetric recess 117. In the example of FIG. 1 the rotational axis 18 of the recess 117 extends through a region of the substrate in which there are no electrically conductive coatings on either the top side or the underside.

FIG. 2 shows a printed circuit board with an upper level surface and a lower level surface which extend parallel to one another. The printed circuit board 11 is depicted in FIG. 2 with line of sight onto the upper surface. Onto this surface is applied a first oval area 13 of electrically conductive material. A strip line 14 extending in a straight line from the convex outer margin of the first area 13 to a margin of the printed circuit board 11, depicted at the lower end in FIG. 2, together with the first area 13 forms a continuous electrically conductive coating on the upper surface of the printed circuit board 11.

Opposite the strip line 14 on the lower level surface of the printed circuit board 11, a second oval area 15 is applied on the surface. As is also the case in the following Figures, electrically conductive areas on the underside (e.g. in the Figures areas located on the backside of the particular printed circuit board) are depicted hatched and traced out by dashed lines. The first area 13 and the second area 15 are shaped identically and have the same dimensions, wherein, however, in the top view depicted in FIG. 2, they are disposed symmetrically to an, in FIG. 2 horizontally extending, axis of symmetry, not shown. Oval areas do not change their shape through mirroring. FIG. 2 shows, however, still a particularity which is only provided in a special preferable realization, namely spared strips which are devoid of conductive material. The strips are denoted by the reference symbols 17a to 17d. Their position within the oval area 13, corresponds to mirror symmetry, e.g. each of the strips 17 terminates at the portion of the convex outer margins of the oval areas 13, 15 facing each other. On the outlying regions of the convex outer margins, in contrast, there are no strip-shaped clearances, e.g. the strips terminate at a distance from these convex outer margin regions located close to the outer margins of the printed circuit board 11.

A connector 16 on the printed circuit board 11, depicted at the lower end in FIG. 2 and secured on the printed circuit board 11, serves for the electric connection of the first area 13 and the second area 15 to a high-frequency line not depicted in FIG. 2. The connector 16 is, for example, a coaxial plug or a coaxial jack. The strip line 14 is herein connected to the one conductor of the connector 16 and the second area 15 to the other conductor of the connector 16, for example to the outer conductor in the case of a coaxial plug or a coaxial jack.

Indicated in FIG. 2 is also the position of the charging coil 2 beneath the printed circuit board 11. The charging coil 2 can be secured on the printed circuit board 11. However, in this case the charging coil is disposed via a spacer at a distance from the lower surface of the printed circuit board since on the lower surface of the printed circuit board 11 is located the second area 15. Such a securement of the charging coil on a printed circuit board or another carrier with a spacer can also be carried out in other embodiments. The spacer is, for example, a rod of electrically non-conductive and non-ferromagnetic material, for example synthetic material.

The configuration depicted in FIG. 2 can be modified in the following manner: the strip-shaped clearances which are disposed symmetrically to a center axis extending in the vertical direction of the printed circuit board, can be omitted. However, in this case the configuration loses the property of having the capability of coupling, even in a region of lower frequencies, radio waves at low coupling attenuation. Alternatively, or additionally, the electrically conductive areas on the upper and the lower surface of the printed circuit board can be shaped differently, for example, circularly, elliptically, semicircularly or hemielliptically. However, it is in every case preferred for the convex outer margins to be located at the sides of the areas in plan view facing one another if the area is not traced out by a continuous encompassing convex outer margin. This is, for example, also the case in the embodiment in FIG. 3 yet to be described in detail, in which, however, there are further differences from the embodiment of FIG. 2.

The configuration depicted in FIG. 2 can also be provided multiply located one next to the other. The printed circuit board 11 can, for example, also have three times the size of the surface depicted in FIG. 2 and three of the pairs of oval areas can be disposed one next to the other. The same also applies to further antenna structures which will be described in the following in conjunction with FIGS. 3 to 8. These antenna structures with several antennas can, as will yet be described in particular in conjunction with FIG. 9, be switched selectively, for example, via a multiplex switch for the operation of a radio link to the radio antenna of the radio device. For example, the connector 16 according to FIG. 2 is therefore connected to a terminal of a multiplex switch. At least one further pair of oval areas is connected across another connector to another terminal of the multiplex switch. If indicated, further pairs of oval areas are provided which, again, are each connected to a terminal of the multiplex switch.

In the printed circuit board 21 depicted in FIG. 3, electrically conductive antenna structures are applied exclusively in a coating on the upper surface of the printed circuit board 21. The first area 23 and the second area 25 are again disposed symmetrically to an axis of mirror symmetry, which, in this case, extends in the vertical direction in the center of the printed circuit board 21. Vertical is here understood to indicate that the axis lies in the plane of drawing and extends from top to bottom in FIG. 3. At the convex outer margins of areas 23, 25 facing one another, they are each connected to a balun 24 across a short strip line 27, 28, which is located in the same electrically conductive coating as areas 23, 25. The balun 24 is further connected across a further strip line 26 of the coating to a high-frequency line not depicted in FIG. 3. On the backside there is located opposite the strip line 26 an electrically conductive ground surface 22 (hatched in FIG. 3), which is also connected to the balun 24 and connects it to that of the high-frequency line.

The areas 23, 25 depicted in FIG. 3 have a convex outer margin with a variable radius of curvature. In an alternative realization, the radius of curvature could, however, be constant such that the areas in this case are semicircles. In the case depicted concretely in FIG. 3, the convex outer margins are margins of half an ellipse or are parabolic. They could also be the outer margins of half an oval.

A possible position of a charging coil 2, which is preferably secured on the underside of the printed circuit board 21 without a spacer, is depicted in FIG. 3. In the top view of FIG. 3 the charging coil 2 is located between the convex outer margins of the areas 23, 25 in a region in which the distance between the areas 23, 25 is small.

FIG. 8 shows on a printed circuit board 81 two antenna structures 83, 85 which, for example, are shaped and are disposed relative to one another as in FIG. 2 or 3. Instead of a balun 24, the discrete structures are, however, connected directly to a high-frequency connection line 89. One end of the high-frequency connection line 89 is depicted schematically in the center of the printed circuit board 81 by two concentric circles. For example, the outer concentric circle symbolizes the shielding of the line 89 and the inner circle symbolizes the antenna signal line proper. In the embodiment example the antenna structure 83 depicted on the left is connected via a short strip line 88 to the shielding of line 89 and the antenna structure 85 depicted on the right via a short strip line 87 to the signal line. One or both strip lines can be contacted through the printed circuit board 81 with the high-frequency connection line 89.

To indicate that several different positions are feasible for the disposition of the charging coil on the underside of the printed circuit board, the charging coil 2 in the embodiment of FIG. 8 is disposed at a different site than in the embodiment of FIG. 3. However, it can again be located directly on the lower surface of the printed circuit board 81.

The embodiments depicted in FIG. 2, FIG. 3 and FIG. 8 are of advantage for the coupling of radio apparatus which can be disposed at different positions above the surface of the printed circuit board without having to accept substantial changes of the coupling attenuation. For example the coupling on the right side of the printed circuit board 21 in FIG. 3 above the second area 25 would be of the same signal quality as on the left side above the first area 23. The same applies to the positionings above the first area 13 and the second area 15 in FIG. 2.

The printed circuit board 31 depicted in FIG. 4 comprises at its upper level surface an antenna structure which, similarly as in the embodiment in FIG. 3, has in the first area 23 a convex outer margin 34, which in the concrete embodiment example, for example, is formed parabolically or hemielliptically. An inner region of the structure, however, is devoid of electrically conductive material of this antenna structure, which does not exclude that in the spared region another antenna structure is disposed. Due to the clearance, the antenna structure 33 also has a concave inner margin. The outer margin 34 and the inner margin 32 are formed such that between them a strip-shaped region of electrically conductive material is provided which forms the antenna structure 33. This applies correspondingly not only to the form of the outer margin and of the inner margin shown concretely in FIG. 4. The outer margin and the inner margin could rather also be curved differently, for example could extend in the form of a semicircle or a semioval.

FIG. 4 shows yet a further special feature of the shape formation of the antenna structure. The two margins 32, 34 diverge at the free ends of the strip that forms the antenna structure. Stated differently: the strip becomes wider in the direction toward its free ends. These two free ends are furthest removed from the ground surface 35 applied on the backside, e.g. on the lower level surface of the printed circuit board 31. This ground surface 35 is opposite a strip line 36 on the upper surface, which serves for the electric connection of the antenna structure 33. The ground surface 35 includes a straight margin at the side that is opposite the protrusion formed by the margin 34. In top view the straight margin of the ground surface 35 is spaced apart from the protrusion of margins 32, 34.

Independently of the concrete form of the margins of the antenna structure depicted in FIG. 4, for example, parabolic, elliptic, oval, it is preferred for the antenna structure to be symmetric to a center axis of the straight strip line 46 and therefore for the strip line 46 to contact the antenna structure in a point from which extend two equally long, electrically conductive and curved strips.

In the embodiment depicted in FIG. 4 the charging coil 2 can also be located on the underside of the printed circuit board 31, and specifically be secured either via a spacer at a spacing from the lower surface or, since the electrically conductive area 35 on the underside of the printed circuit board 31 is only a ground surface, also directly on the lower surface of the printed circuit board 31.

The charging coil 2 is preferably herein—viewed in the top view of FIG. 4—disposed within the concave inner margin 32 of the cup-like antenna structure 33. The charging coil can alternatively also be disposed outside of the convex outer margin laterally to the cup-like structure 33. If, as depicted for example in FIG. 9, several cup-like antennas are provided, preferably only one charging coil is provided, for example within the concave inner margin of one of the cup-like antennas.

FIG. 5 shows an antenna structure 33 as in FIG. 4, wherein, also similarly to FIG. 4, the structure is electrically connected through a straight-line strip line 46. Again, on the opposite surface of the printed circuit board 41 a ground surface 45 is located.

However, in the spared region within the concave inner margin 32 is disposed a second antenna structure 37 which is formed in the shape of a meander. The second antenna structure 37 is electrically connected at a point 38 of the first antenna structure 33 at which the straight strip line 46 starts. Starting from this connection point 38, the second antenna structure 37 meanders between the two strips of the first antenna structure 33, wherein the length of the individual segments of the second structure 37, which extends between the strips of structure 33, increases with increasing distance from the connection point 38 since more space is available for these segments. In this way the space available through the spared region is optimally utilized. As already stated above, for the wavelengths of the radio waves to be coupled, the length of the strip is decisive. Through optimal utilization of the space therefore the longest possible strip can be accommodated in the spared region. The spacing of the strips of the second structure 37 extending between the strips of the first structure 33 is preferably constant and is also preferably equal to the width of the strip segments. The spacing is determined in a direction which extends in extension of the longitudinal axis of the connection strip line 46. In FIG. 5 this direction, in which the distance is measured, extends in the horizontal direction.

The charging coil 2—in the top view of FIG. 5—is disposed outside of the inner space of the antenna structure 33 defined by the concave inner margin 32, close to the second structure 37. However, alternatively, the position outside of the cup-like structure 33, next to the convex outer margin 34, is also possible such as for example in the embodiment described in the following in conjunction with FIG. 6, in which however the second structure within the first structure has a different formation.

FIG. 6 shows a variant of the configuration depicted in FIG. 5. Again, the spared region within the first structure 33 is provided with a second structure. The second structure 47, however, in contrast to structure 37 of FIG. 5, comprises two strips which, starting from the connection point 38 and a bifurcation, extend on both sides of the axis of symmetry that extends in extension of the longitudinal axis of the strip line 46. Both strips have the shape of labyrinths, wherein the segments extending in changing directions are curved corresponding to the curvature given by the margin of the spared area. Herein the spacings of the longitudinal segments of the strips, extending in changing directions, are smaller in the proximity of the connection point 38 than in the proximity of the free ends of the strips of the first structure 33.

In FIG. 6 the ground surface on the opposite surface of the printed circuit board 51 is denoted by the reference symbol 55.

FIG. 7 also shows a variant of FIG. 5 and FIG. 6, in which the first antenna structure 33 is realized in the same manner and in which this structure is electrically connected via a straight strip line 66. The ground surface on the opposite surface of substrate 61 is denoted by the reference symbol 65.

The second structure 57 extends in the spared region within the inner margin 32 of the first structure 33 as well as also in the outer regions outside of the outer margin 34 of the first structure 33. Again, similarly as in the embodiment of FIG. 6, the second structure 57, starting from the connection point 38, extends into the spared region up to a bifurcation 39. Here, two strips of the second structure 57 start which extend symmetrically to the extension of the longitudinal axis of the strip line 66 on both sides through the spared region. Initially the strips follow the course of the strips of the first structure 33 until they reach the free end of the strips of the first structure 33. In the subsequent course of the strips of the second structure 57 they extend outwardly in the direction of the region located outside of the outer margin 34 of the first structure 33. Here longitudinal segments of the strips of the second structure 57 adjoin, which extend in the direction of the ground surface 65. In each case, optionally, at least one further longitudinal section of the strip can adjoin here such that in the region outside of the outer margins 34 a meander shape is generated. In contrast to FIG. 7, still further longitudinal segments in the form of meanders can adjoin in this outer region.

The first structure 33 depicted in FIGS. 5 to 7, as already stated above in conjunction with structure 33 in FIG. 4, can be shaped differently, for example in the form of a semicircle, semioval or hemiellipse.

Again, similarly as the embodiment of FIG. 4, the charging coil 2 is disposed within the cup-like first structure 33 when viewed in top view. This is possible since within the concave inner margins of the second structure 57 there remains also a clearance, in which there is no electrically conductive material of the coating.

FIG. 9 shows a circuit board 101 with a plurality of antennas 102a to 102e. In the embodiment example (as well as preferably also in others) the antennas 102 are equivalent. They serve the purpose of enabling the transmission of radio signals over a relatively large area. If a radio apparatus, for example a mobile telephone, is positioned above the circuit board 101, a radio link from the radio apparatus to several antennas 102 can be established. However, the radio link to one or two of the antennas 102 will function better, e.g. with lower signal transmission losses or with lower coupling attenuation, than with the other antennas 102.

Each of the antennas 102 is connected via a connection line 103a to 103e to a multiplex switch 104. The multiplex switch 104 comprises, in addition, a terminal 104a. With this terminal 104a each of the connection lines 103a to 103e can selectively be connected. To the terminal 104a is further connected a detector 105 for the detection of the signal strength or signal quality that is transmitted across the terminal 104a. In the embodiment example the detector 105 is connected to an analog/digital converter 107, which converts the detector signal of detector 105 into a digital signal and supplies it to a digital data processor 108. Based on the received digital signal, this processor determines the signal quality. In addition, the processor 108 receives from the multiplex switch 104 the data regarding the instantaneous switching state of switch 104, e.g. information about which connection line 103 is currently connected to terminal 104a.

At the start of operation of a radio apparatus, via a coupling which takes place by means of the antennas 102 on circuit board 101, the multiplex switch 104 switches successively all connections between the terminal 104a and the connection lines 103. For each of these switching states the detector 105 detects the corresponding signal quality. The processor 108 determines the switching state with the best signal quality and controls the multiplex switch 104 such that during the further coupling operation this switch establishes and maintains the switching state with the determined best signal quality.

The vertical section through a portion of a mobile telephone 111, shown in FIG. 10 reveals a housing 112 comprising a receptacle 113 for the reception of an energy store 114. The energy store 114 is, for example, a lithium ion accumulator or another electrochemical energy store.

The receptacle 113 is closed with a cover 115. The cover 115 comprises a projection 204 in the form of a truncated cone, which tapers upwardly and which below on the inside includes a correspondingly formed truncated cone-shaped hollow volume. Into this hollow volume projects a secondary-side antenna 230, for example a coil of a plurality of copper wire windings. The secondary-side antenna 230 is secured on a specimen of the energy store 114 modified for the invention. A conventional energy store, which, as a rule, is cuboid, can therefore be exchanged against such an energy store 114, wherein, in addition, the conventionally flat battery compartment cover is replaced by the cover 115 depicted in FIG. 10.

The energy store 114 furthermore comprises the conventional electrical contacts 210 for the electrical contacting of corresponding contacts of the mobile telephone. Into the energy store 114, moreover, an electric charging circuit 220 is integrated which enables charging the electric energy generated through induction by the secondary-side antenna 230 based on the received electromagnetic waves into the energy store proper, for example the electrochemical energy store.

FIG. 11 shows also a vertical section, wherein, however, the portion of the mobile telephone 111 depicted in FIG. 10 is oriented differently. It abuts on a abutting surface 119 of a configuration for coupling the mobile telephone to devices of the motor vehicle, wherein the truncated cone-shaped projection 204 of the cover 115 and the secondary-side antenna 230 are oriented downwardly with their rotational axis. They project into a corresponding truncated cone-shaped recess 117 of configuration 5. Further means for coupling in particular the radio antenna of the mobile telephone 111 to devices (for example hands-free device, outside antenna of the motor vehicle) are not depicted in the Figures.

FIG. 11 shows directly beneath the recess 117 a plate-shaped carrier 205 on the upper surface of which antenna structures 217a, 217b of two different antennas are disposed. On the underside of the substrate 205 is provided a primary-side charging coil 2 for the generation of the electromagnetic waves to be received by the secondary-side antenna 230. The primary-side charging coil 2 is preferably realized by a plurality of windings of an electric conductor (for example copper wire), wherein the rotational axis of the windings coincides with the rotational axis 18 of the truncated cone-shaped recess 117.

In the top view of FIG. 12 the mobile telephone 111 is depicted in an arbitrary rotational position about the rotational axis of the secondary-side antenna 230, which coincides with the rotational axis of the recess 117. The primary-side antenna 230 is here in the position depicted in FIG. 11 within the recess 117. Although the secondary-side antenna 230 would not be visible in the top view, it is depicted in FIG. 12 in order to elucidate the embodiment example of the invention. The mobile telephone 111 could assume any other rotational position about the rotational axis 18, wherein, however, the secondary-side antenna 230 in every case is positioned within the recess 117 or directly above the recess 117 and herein the rotational axes of the projection 204 of cover 115 and recess 117 coincide.

Furthermore, the position of five antennas 102, for example in a disposition as in FIG. 9, is indicated by dashed lines. As shown in FIG. 11, the antennas 102 are located on the upper surface of substrate 205, however, they are not visible (except when using transparent covering material) since thereabove still covering material is provided which forms the abutting surface and includes the recess 117. The covering material comprising the recess can herein be directly in contact with the electrically conductive material of the antennas. This applies also to other embodiments.

The invention claimed is:

1. A configuration for the wireless coupling of a radio apparatus (9) via a radio link to a device of a motor vehicle or to a stationary radio device, wherein the configuration comprises:

an abutting surface for abutting the radio apparatus;

an antenna to establish and maintain the wireless coupling of the radio apparatus or a plurality of antennas disposed one next to the other, which are selectively operable in order to establish and maintain the wireless coupling of the radio apparatus, wherein the abutting surface comprises a recess rotationally symmetric about a rotational axis extending perpendicularly to the abutting surface, such that a radio apparatus with a projection, that engages into the recess, at different rotational positions with respect to the rotational axis can operate a radio link to the antenna or to one antenna of the plurality of antennas, and such that, alternatively, the radio apparatus that does not engage into the recess however abuts on the abutting surface, can be located within a space, delimited by the abutting surface and the configuration, in any arbitrary orientation and any arbitrary position and in each instance can operate a radio link to the antenna or to one antenna of the plurality of antennas; and a primary-side charging coil for the generation of an electromagnetic field that is receivable by a secondary-side charging device of the radio apparatus and is utilizable for charging an energy store of the radio apparatus, wherein the primary-side charging coil is oriented relative to the rotational axis such that the magnetic flux density of the electromagnetic field generated by the primary-side charging coil is maximum in the direction of the rotational axis;

wherein the antenna or the antennas is or are each formed by at least one electrically conductive coating supported by a substrate of electrically non-conductive material, wherein the coating or coatings extends or extend along the abutting surface;

wherein the electrically conductive coating or coatings of at least a portion of the antennas are disposed at a lesser or the same distance from the abutting surface than the charging coil (2); and with respect to the coupling attenuation of the possible radio links between the radio antenna of the radio apparatus and the antenna or one antenna of the plurality of antennas the following applies:
  a. the radio link between the radio antenna and the antenna or one other antenna of the plurality of antennas at any arbitrary position and/or orientation of the radio apparatus relative to the configuration undergoes substantially the same coupling attenuation when the radio apparatus abuts on the abutting surface independently of whether or not the projection engages into the recess, and/or
  b. the coupling attenuation of the radio link does not exceed a maximum value given for the entire range of possible positions and orientations of the radio apparatus while it abuts on the abutting surface, independently of whether or not the projection engages into the recess.

2. A configuration according to claim 1, wherein the configuration is implemented to select in each instance that antenna of the plurality of antennas via which the radio link to the radio antenna of the radio apparatus undergoes the least coupling attenuation.

3. A configuration according to claim 2, wherein the electrically conductive coating or coatings extends or extend in a spatial region delimited by two planes parallel with respect to one another which are parallel to the abutting surface.

4. A configuration according to claim 3, wherein the electrically conductive coating or coatings is or are in the form of strips.

5. A configuration according to claim 4, wherein the substrate is a plate-shaped substrate, on one side of which the electrically conductive coating or coatings of at least one antenna is or are disposed and on whose opposite side, further removed from the abutting surface, the charging coil is disposed.

6. A configuration according to claim 3, wherein the substrate is a plate-shaped substrate, on one side of which the electrically conductive coating or coatings of at least one antenna is or are disposed and on whose opposite side, further removed from the abutting surface, the charging coil is disposed.

7. A configuration according to claim 2, wherein the electrically conductive coating or coatings is or are in the form of strips.

8. A configuration according to claim 7, wherein the substrate is a plate-shaped substrate, on one side of which the electrically conductive coating or coatings of at least one antenna is or are disposed and on whose opposite side, further removed from the abutting surface, the charging coil is disposed.

9. A configuration according to claim 2, wherein the substrate is a plate-shaped substrate, on one side of which the electrically conductive coating or coatings of at least one antenna is or are disposed and on whose opposite side, further removed from the abutting surface, the charging coil is disposed.

10. A configuration according to claim 1, wherein the electrically conductive coating or coatings extends or extend in a spatial region delimited by two planes parallel with respect to one another which are parallel to the abutting surface.

11. A configuration according to claim 10, wherein the electrically conductive coating or coatings is or are in the form of strips.

12. A configuration according to claim 11, wherein the substrate is a plate-shaped substrate, on one side of which the electrically conductive coating or coatings of at least one antenna is or are disposed and on whose opposite side, further removed from the abutting surface, the charging coil is disposed.

13. A configuration according to claim 10, wherein the substrate is a plate-shaped substrate, on one side of Which the electrically conductive coating or coatings of at least one antenna is or are disposed and on whose opposite side, further removed from the abutting surface, the charging coil is disposed.

14. A configuration according to claim 1, wherein the electrically conductive coating or coatings is or are in the form of strips.

15. A configuration according to claim 14, wherein the substrate is a plate-shaped substrate, on one side of which the electrically conductive coating or coatings of at least one antenna is or are disposed and on whose opposite side, further removed from the abutting surface, the charging coil is disposed.

16. A configuration according to claim 1, wherein the substrate is a plate-shaped substrate, on one side of which the electrically conductive coating or coatings of at least one antenna is or are disposed and on whose opposite side, further removed from the abutting surface, the charging coil is disposed.

17. A configuration according to claim 1, wherein
  the substrate comprises a first level surface and a second level surface located on the opposite side of the substrate, wherein the second level surface extends parallel to the first level surface;
  on the first surface a first electrically conductive coating is applied which during the operation of the configuration as the coupling antenna emits radio waves to an antenna of the radio apparatus and/or receives them from it and thereby couples the radio apparatus;
  the first electrically conductive coating comprises a first area that comprises a convex outer margin;
  the first area is connected via a preferably straight connection line, implemented as a strip line, which is a portion of the first electrically conductive coating, electrically conductingly to a first contact of a terminal for connecting a high-frequency line, wherein the strip line extends from the convex outer margin up to a margin region of the substrate;
  the second electrically conductive coating is applied on the second surface;
  the second electrically conductive coating comprises a second area which comprises a convex outer margin;

the region of the second electrically conductive coating which comprises the second area is applied on a subregion of the second surface, wherein, in line of sight from the subregion, on the opposite side of the substrate the strip line is applied on the first. surface;

the second area is connected electrically conductingly to a second contact of the terminal.

18. A configuration as claim 1, wherein the substrate comprises at least one first level surface;

on the first surface the electrically conductive coating or one of the electrically conductive coatings is applied which, during operation of the configuration as a coupling antenna, emits and/or receives radio waves to or from a radio antenna of the radio apparatus and thereby couples the radio apparatus;

the electrically conductive coating comprises on the first surface a first area which comprises a convex outer margin;

the electrically conductive coating comprises on the first surface a second area which comprises a convex outer margin;

the first and the second area are applied on different subregions of the first surface, wherein the first and the second area are connected at their convex margin across a balun to the high-frequency line.

19. A method for the wireless coupling of a radio apparatus via a radio link, to a device of a motor vehicle or to a stationary radio device, comprising the steps of:

disposing the radio apparatus is disposed so as to abut on a abutting surface, wherein the abutting surface comprises a recess rotationally symmetric about a rotational axis extending perpendicularly to the abutting surface, wherein for disposing the radio apparatus so as to abut on the abutting surface a projection of the radio apparatus is introduced into the recess and one of several possible different rotational positions with respect to the rotational axis is set or, alternatively, the radio apparatus or another radio apparatus within a space, delimited by the abutting surface and optionally by further parts of a coupling configuration, is disposed in any arbitrary orientation and any arbitrary position so as to abut on the abutting surface;

wherein between a radio antenna of the docked radio apparatus and an antenna disposed on the abutting surface a radio link is operated, wherein in the other rotational positions or other orientations and positions a radio link would also be operable between the radio antenna and the antenna disposed on the abutting surface and, if indicated, is also operated, or and a selected antenna, which is selected from a plurality of antennas positioned along the abutting surface one next to the other, a radio link is operated, wherein also in the other rotational positions or in other orientations and positions a radio link between the radio antenna, on the one hand, and the selected antenna or another antenna selected from the plurality of antennas positioned one next to the other along the abutting surface, on the other hand, would also, on the other hand, be operable and, if indicated, is also operated;

while the projection of the radio apparatus is disposed in the recess, a secondary-side receiving device of the radio apparatus is inductively supplied with energy by a primary-side charging coil of the configuration through an electromagnetic field, while the radio link is operated, wherein the primary-side charging coil is oriented relative to the rotational axis such that the magnetic flux density of the electromagnetic field generated by the primary-side charging coil is maximum in the direction of the rotational axis;

with respect to the coupling attenuation of the possible radio links between the radio antenna of the radio apparatus, on the one hand, and the antenna or one antenna of the plurality of antennas, on the other hand, the following is ensured:

a. the radio link between the radio antenna and the antenna or one other antenna of the plurality of antennas at any arbitrary position and/or orientation of the radio apparatus relative to the configuration undergoes substantially the same coupling attenuation when the radio abuts on the abutting surface, independently of whether or not the projection engages into the recess, and/or b. the coupling attenuation of the radio link does not exceed a maximum value given for the entire range of possible positions and orientations of the radio apparatus while it abuts on the abutting surface, independently of whether or not the projection engages into the recess.

20. A method for the production of a configuration for the wireless coupling of a radio apparatus, in particular of a mobile telephone, via a radio link, in particular to a device of a motor vehicle or to a stationary radio device, comprising the steps of:

providing an abutting surface for abutting the radio apparatus;

providing an antenna is provided in order to establish and maintain the wireless coupling of the radio apparatus or along the abutting surface a plurality of antennas positioned one next to the other is disposed which are selectively operable in order to establish and maintain the wireless coupling of the radio apparatus;

in the abutting surface a recess rotationally symmetric about a rotational axis extending perpendicularly to the abutting surface is provided such that a radio apparatus with a projection that engages into the recess at different rotational positions with respect to the rotational axis can operate a radio link to the antenna or to one antenna of the plurality of antennas and such that, alternatively, a radio apparatus that does not engage into the recess however abuts on the abutting surface, within a space, delimited by the abutting surface and by the configuration, can be in any arbitrary orientation and any arbitrary position and in each instance can operate a radio link to the antenna or to one antenna of the plurality of antennas, providing a primary-side charging coil is provided for the generation of an electromagnetic field which is receivable by a secondary side charging device of the radio apparatus and is utilizable for charging an energy store of the radio apparatus, orienting the primary-side charging coil relative to the rotational axis such that the magnetic flux density of the electromagnetic field generated by the primary-side charging coil is maximum in the direction of the rotational axis;

forming the antenna or the antennas by electrically conductive coatings supported by a substrate of electrically non-conductive material;

wherein the electrically conductive coatings of at least a portion of the antennas are disposed at a lesser or equal distance from the abutting surface than the charging coil, and wherein with respect to the coupling attenuation of the possible radio links between the radio antenna of the radio apparatus, on the one hand, and the antenna or one antenna of the plurality of the antennas, on the other hand, the following applies:
a. the radio link between the radio antenna and the antenna or one other antenna of the plurality of antennas undergoes in any arbitrary position and/or orientation of the radio apparatus relative to the configuration substantially the same coupling attenuation when the radio apparatus abuts on the abutting surface, independently of whether or not the projection engages into the recess, and/or
b. the coupling attenuation of the radio link does not exceed a maximum value given for the entire range of possible positions and orientations of the radio apparatus while it abuts on the abutting surface, independently of whether or not the projection engages into the recess.

\* \* \* \* \*